Nov. 1, 1927.

E. T. BURTON 1,647,270

SYSTEM FOR INDICATING FREQUENCY CHANGES

Filed March 7, 1924

Inventor
Everett T. Burton
by C. W. Adams, Atty.

Patented Nov. 1, 1927.

1,647,270

UNITED STATES PATENT OFFICE.

EVERETT T. BURTON, OF JACKSON HEIGHTS, NEW YORK, ASSIGNOR TO WESTERN ELECTRIC COMPANY, INCORPORATED, OF NEW YORK, N. Y., A CORPORATION OF NEW YORK.

SYSTEM FOR INDICATING FREQUENCY CHANGES.

Application filed March 7, 1924. Serial No. 697,578.

This invention relates to systems for indicating frequency changes.

It is an object of the invention to indicate efficiently and accurately all changes in the frequency of the current generated by any suitable source of alternating current.

It is frequently desirable, in connection with an alternating current generator or other source of alternating current, to keep the frequency constant, and for this purpose it is desirable that any change in frequency be indicated. In accordance with one of the features of the invention, means are provided for instantly and accurately indicating comparatively small changes in the frequency of an alternating current source.

To this end, a part of the energy generated is transmitted through two input circuits, each of which includes a network having a characteristic such that a large change in attenuation occurs for a small change in frequency, one of the networks increasing its attenuation and the other of the networks decreasing its attenuation for a change in frequency in the same direction. Means are provided for rectifying the outputs of the two networks in succession in such a manner that current flows to an indicating or measuring device first from one and then the other network. The indicating device is so arranged that the operating forces are opposed so that no operation is produced except when the input currents from the networks are unequal, which condition will prevail only when the output of the alternating current source increases or decreases above or below a normal critical frequency. An audible, as well as a visible or any other desired type of alarm, may be provided for indicating frequency changes.

Other features and advantages of the invention will appear from the consideration of the following description taken in connection with the accompanying drawing, in which Fig. 1 is a diagrammatic illustration of a system embodying the invention.

Figure 1:
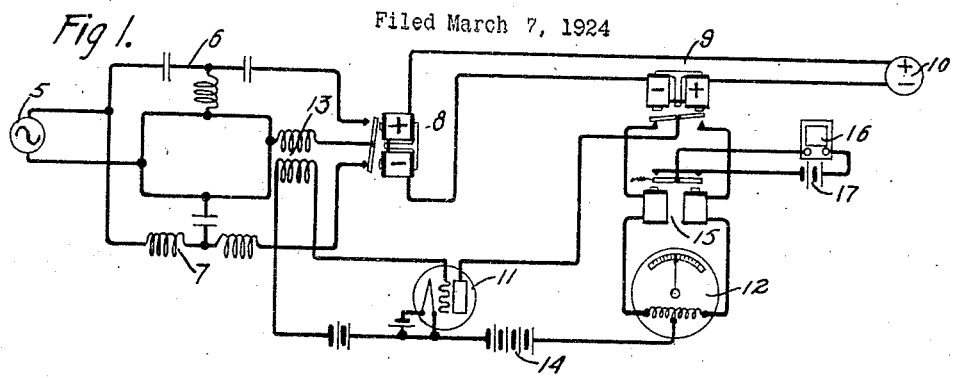

As shown in Fig. 1, any suitable source of alternating current, such as a generator 5, has its poles connected to the input of a high pass filter 6 and to the input of a low pass filter 7 in parallel therewith. The filters 6 and 7 are of a type well known in the art, and have characteristics such that they will transmit with substantially negligible attenuation a band of frequencies of definite width, while sharply attenuating frequencies lying to one side of the band. In general, a high pass filter suppresses all frequencies lying below a critical frequency, while a low pass filter suppresses all frequencies lying above a critical frequency.

A pair of polarized relays 8 and 9 are connected in series with a source of current reversals 10, such as a 60 cycle source of ringing current, so that the armatures of these relays will be operated rapidly and simultaneously and will remain an equal length of time on each of their two contacts. The polarized relay 8 is arranged to alternately connect first one and then the other of the two networks 6 and 7 to the input of a rectifier 11, and the polarized relay 9 is arranged to alternately connect the output of the rectifier 11 first to one half and then to the other half of the winding of a differential galvanometer 12. The rectifier 11 may be of any suitable type, such as a detector of the type commonly used in radio transmission, or a thermocouple may be used in place of the rectifier. This rectifier is here shown as a highly evacuated three-element electron discharge tube, but any other suitable rectifier may be employed.

The input of the detector 11 is connected in series with the secondary of a transformer 13, the primary of which is connected between the common output of the filters 6 and 7 and the mid-point of the armature of relay 8. Space current is supplied to the detector 11 from a battery 14 through one or the other of the differential windings of the galvanometer 12, one of the windings of a two-winding relay 15, one of the contacts of polarized relay 9 and the armature of that relay to the anode of detector 11.

Figure 2:
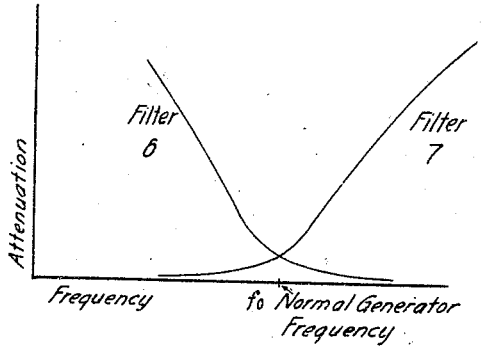
Fig. 2 shows curves illustrating the operation of the system of Fig. 1.

The characteristics of the filters 6 and 7 are indicated in Fig. 2, in which attenuation is plotted against frequency. It will be seen from Fig. 2 that the attenuation of the filter 6 is practically negligible for frequencies above the frequency $f_0$, but as the frequency falls below this critical frequency, the attenuation increases very rapidly, so that the filter is said to have a very sharp cut-off at this point. Similarly, the low pass filter 7 has substantially no attenuation at frequencies from zero up to the critical frequency $f_0$, but the attenuation increases very rapidly for frequencies higher than $f_0$. The point of intersection of the two attenuation curves need not, of course, be exactly at the critical or cut-off frequencies of the filters. In fact, it is in some cases preferable to have the intersection slightly above the cut-off frequency of the low pass filter and slightly below that of the high pass filter.

As pointed out above, the polarized relays 8 and 9 are operated simultaneously from the source of current reversals 10 in such a manner that they remain an equal length of time on each of their two contacts. For example, when the armature of the relay 8 is on its lower contact and the armature of the relay 9 is on its left hand contact, the current from the low pass filter 7 passes through the detector circuit, and the rectified current flows through the left hand winding of galvanometer 12 and the left hand winding of relay 15. When the armature of relay 8 is on its upper contact and the armature of relay 9 is on its right hand contact, however, the current from high pass filter 6 causes rectified current to pass through the right hand windings of galvanometer 12 and relay 15. It will at once be evident from the curves of Fig. 2 that if the generator 5 is generating a frequency $f_0$, the alternating current outputs of the filters 6 and 7 will be equal, and hence the rectified current output of the detector 11 impressed alternately upon the left hand windings of galvanometer 12 and relay 15, and then upon the right hand windings of the galvanometer and relay, will be equal. Current flowing through the left hand winding of galvanometer 12 and relay 15, under the conditions shown in Fig. 1, tends to deflect the needle of the galvanometer toward the left and to attract the armature of the relay 15 to the left hand winding, but since an equal current is almost immediately connected to the right hand windings of the galvanometer and relay, which are connected differentially, no operating force acts on the galvanometer needle or relay armature. When the currents passing through the networks 6 and 7 are unequal, due to an increase or decrease in the frequency of the generator 5, the meter 12 will show a deflection corresponding to the relative magnitudes of the output rectified currents, and when the inequality goes beyond a given amount, relay 15 will be operated in a direction depending upon whether the output of the generator 5 has increased or decreased. The operation of relay 15 in either direction closes a circuit through a monitoring buzzer 16 and a battery 17. The galvanometer 12 and the relay 15 are sufficiently slow or sluggish in action to prevent them from following the operation of the relays 8 and 9. The equal currents impressed first upon one winding and then upon the other winding of the galvanometer and of the relay 15 have a neutralizing effect upon the galvanometer needle and the relay armature, which therefore will normally stay in the centered position shown in Fig. 1. The relay 15 may also be adjusted so that small changes in the frequency of the generator 5 will be insufficient to produce a resultant current sufficient to operate the armature of this relay in either direction.

Figure 3:
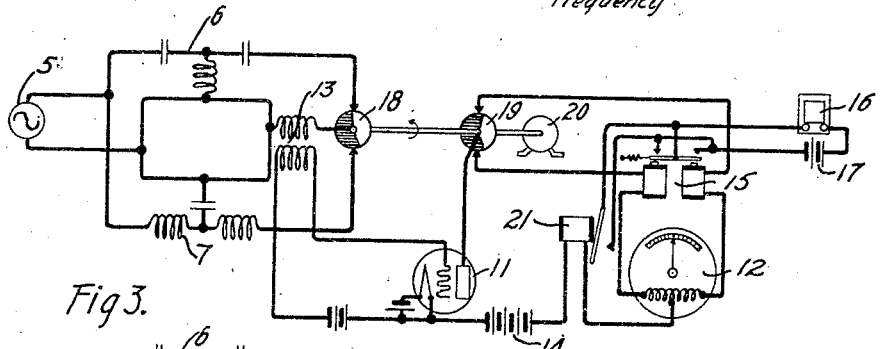
Figs. 3 and 4 are diagrammatic illustrations of modified forms of the invention.

A modification of the invention is shown in Fig. 3. In this system a rotating shaft carrying two commutators is substituted for the relays 8 and 9 of Fig. 1. The motor 20 drives the shaft carrying commutators 18 and 19 which are each divided into conducting and insulating segments. The conducting segment of commutator 18 is preferably slightly shorter than 180 degrees in order that the two brushes may not bear upon this segment at the same time. The conducting segment of commutator 19 is slightly shorter than that of commutator 18 so as to eliminate the possibility of transient currents disturbing the galvanometer readings, such transient currents being dissipated when the conducting segment of commutator 18 enters upon either brush, but while the brushes of commutator 19 still rest on the insulating segment thereof. The motor 20 is operated continuously from any suitable source of current, and it will be obvious that as the commutator shaft rotates, the commutator 18 serves to alternately connect first one, and then the other, of the networks 6 and 7 to the input of the rectifier 11, and that the commutator 19 serves to alternately connect the output of the rectifier first to one half and then to the other half of the winding of galvanometer 12. The galvanometer 12 serves to indicate any change in frequency in the manner described above. Similarly, when an appreciable change in frequency has taken place, the relay 15 is operated to energize the buzzer 16 to give an audible indication of such operation.

A slow acting relay 21 is connected in series with the battery 14 in the plate circuit of the rectifier 11. The armature of this relay is normally energized by the space current of the rectifier, but when the space current stops flowing the armature falls back to close its contact which is in parallel with the contacts of relay 15. By means of this arrangement an alarm is given if trouble occurs in the frequency indicating circuit as well as in the generator 5, and is particularly useful in sounding an alarm if the generator stops or the output of the generator is cut off. If this occurs, the relay 21 will be deenergized causing the energization of the buzzer 16, but since no current flows through the winding of the galvanometer 12 in either direction the galvanometer needle will remain in its centered position. An alarm under these conditions serves to indicate that current has ceased to flow through the indicating system.

Figure 4:
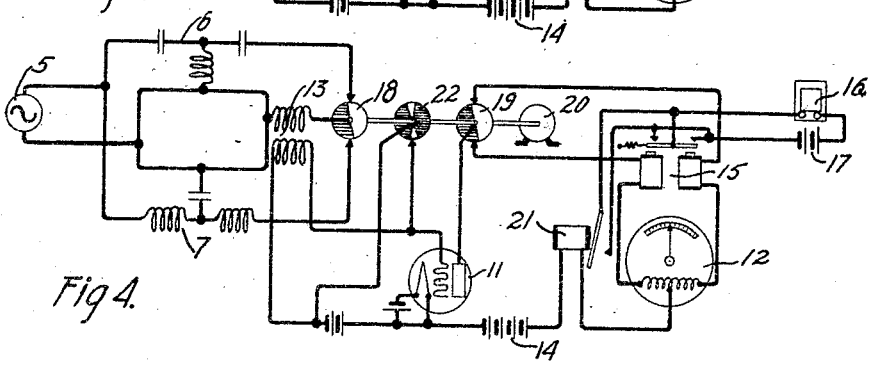

The modification shown in Fig. 4 is similar to the system shown in Fig. 3 except that an additional commutator is employed for the purpose of short-circuiting the input of the rectifier 11 at the times when the other two commutators are switching from one to the other of the two halves of the circuit. For this purpose the commutator 22 is mounted on the shaft of the motor 20 and has two opposite and equal conducting segments which are connected electrically to one branch of the grid circuit of the rectifier 11, and cooperate with the commutator brush which is connected in circuit with the other branch of the grid circuit. In this case the conducting segments of commutators 18 and 19 may each be 180 degrees. It will be seen that during the time the commutators 18 and 19 are in the process of switching, as shown in Fig. 4, the input of the detector 11 will be short-circuited, hence the duration of the time during which the conducting segments of commutators 18 and 19 are in effective engagement with their upper and lower contact brushes is determined by the length of time that commutator 22 remains off contact, and is identical at all times. This is important since if the contact brushes of the system shown in Fig. 3 were allowed to wear unequally, one of them might wear down flat and thus extend over a larger portion of its commutator segment than desirable, thus permitting one of the networks to be associated with the indicating device a longer period of time than the other, and causing a false operation thereof. If desired, the commutator 22 may be replaced by a commutator having a single conducting segment and travelling at double the speed of the commutators 18 and 19.

The circuit arrangements herein shown and described should be considered as merely illustrative of the invention, many detailed changes obviously being possible within the scope and spirit of the invention as defined by the following claims.

What is claimed is:

1. The method of indicating the condition of balance between a pair of incoming circuits which comprises connecting said circuits in rapid alternation and in differential relation to a common indicating device.

2. The method of indicating changes in the frequency of the energy from an alternating current source, which comprises transmitting part of said energy through each of two networks, and alternately connecting said networks to a common indicating device.

3. The method of indicating changes in the frequency of the energy from an alternating current source, which comprises alternately transmitting part of said energy through first one and then the other of two networks, and simultaneously connecting the network through which energy is being transmitted to a common indicating device.

4. The method of indicating changes in the frequency of the energy from an alternating current source, which comprises alternately transmitting part of said energy through first one and then the other of two networks, and differentially impressing the components thus transmitted upon an indicator.

5. The method of indicating changes in the frequency of the energy from an alternating current source, which comprises transmitting part of said energy through a high pass filter and part of said energy through a low pass filter, and alternately connecting first one and then the other of said filters to a common indicating device.

6. The method of indicating changes in the frequency of the energy from an alternating current source, which comprises transmitting part of said energy alternately through high pass and low pass filters, and simultaneously connecting the filter through which energy is being transmitted to an indicating device.

7. The method of indicating changes in the frequency of the energy from an alternating current source, which comprises transmitting part of said energy alternately through high and low pass filters, and differentially impressing the components thus transmitted upon an indicator.

8. In a system for indicating the balance between two or more circuits, a network in each of a plurality of circuits, means for impressing an alternating current upon each of said networks, an indicator, and means for alternately rectifying the outputs of said networks and for successively impressing the rectified currents upon said indicator.

9. A system for indicating frequency changes comprising a source of alternating current, a pair of networks associated therewith, an indicator, and means for alternately and successively connecting said networks to said indicator.

10. A system for indicating frequency changes comprising a source of alternating current, a pair of networks associated therewith, an indicator, and means for rapidly associating first one and then the other of said networks with said indicator.

11. A system for indicating frequency changes comprising a source of alternating current, a pair of networks associated therewith, means for alternately and successively rectifying the outputs of said networks, an indicator, and means for differentially impressing the rectified current components upon said indicator.

12. A system for indicating frequency changes comprising a source of alternating current, a high pass and a low pass filter associated therewith, an indicator, and means for alternately and successively connecting said filters with said indicator.

13. A system for indicating frequency changes comprising a source of alternating current, a high pass and a low pass filter associated therewith, an indicator, and means for rapidly associating first one and then the other of said filters with said indicator.

14. A system for indicating frequency changes comprising a source of alternating current, a pair of networks associated therewith, means for alternately and successively rectifying the outputs of said networks, an indicator, and rapidly operating means for differentially impressing the direct current components upon said indicator.

15. A system for indicating frequency changes comprising a source of alternating current, a pair of networks associated therewith, an indicator, and rapidly operating means for alternately and successively rectifying the outputs of said networks and for differentially impressing the rectified current components upon said indicator.

16. A system for indicating frequency changes comprising a source of alternating current, a high pass and a low pass filter associated therewith, an indicator, and rapidly operating means for alternately and successively rectifying the outputs of said filters and for differentially impressing the rectified current components upon said indicator.

17. A system for indicating frequency changes comprising a source of alternating current, a pair of networks associated therewith, an indicator, a rectifier, and a pair of synchronously operated switching devices for alternately connecting said networks to said rectifier and for differentially impressing the output of said rectifier upon said indicator.

18. A system for indicating frequency changes comprising a source of alternating current, a high pass and a low pass filter associated therewith, a rectifier, a galvanometer, a plurality of rapidly operated commutators having conducting and insulating segments for alternately and successively connecting first one and then the other of said filters to said rectifier and for connecting the output of said rectifier to said indicator, and a slow operating relay having its windings differentially connected to the winding of said galvanometer, and a signal controlled by said relay.

In witness whereof, I hereunto subscribe my name this 29th day of February A. D., 1924.

EVERETT T. BURTON.